United States Patent [19]

Alborante

[11] Patent Number: 5,064,991

[45] Date of Patent: Nov. 12, 1991

[54] DEVICE FOR LASER WELDING MOTOR-VEHICLE BODIES

[75] Inventor: Giancarlo Alborante, Trofarello, Italy

[73] Assignee: Comau SPA, Turin, Italy

[21] Appl. No.: 638,673

[22] Filed: Jan. 8, 1991

[30] Foreign Application Priority Data

Jan. 31, 1990 [IT] Italy .................................. 67074 A/90

[51] Int. Cl.[5] .............................................. B23K 26/00
[52] U.S. Cl. ............................. 219/121.63; 219/121.76
[58] Field of Search ....................... 219/121.63, 121.64, 219/121.76, 121.77

[56] References Cited

U.S. PATENT DOCUMENTS 4,973,817 11/1990 Kanno et al. .................... 219/121.63

Primary Examiner—C. L. Albritton
Attorney, Agent, or Firm—Fish & Richardson

[57] ABSTRACT

A device for welding motor-vehicle bodies which have been assembled loosely beforehand comprises at least one station for welding the bodies, a conveyor line for transporting the loosely preassembled bodies to the station, and locating means provided at the station for clamping the component parts of the body in the correct positions for welding. The device also includes welding means comprising a plurality of laser-welding torches which are associated with the locating means and are connected to one or more laser sources by optical fibres. In a preferred embodiment, the device is applied to a flexible welding station in which the locating means are carried by two or more pairs of locating frames which can be interchanged rapidly in the working position.

8 Claims, 4 Drawing Sheets

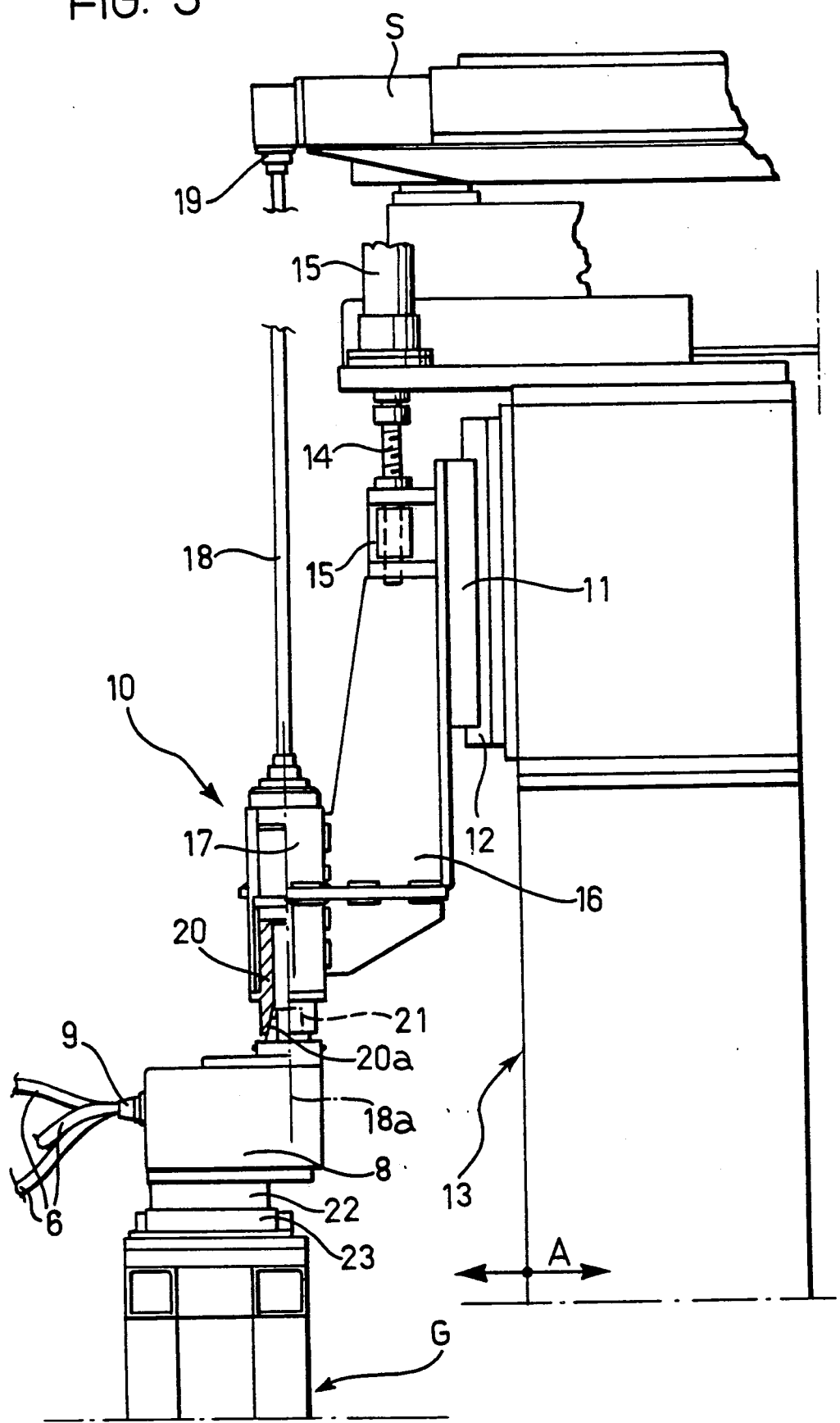

DEVICE FOR LASER WELDING MOTOR-VEHICLE BODIES

The present invention relates to devices for welding motor-vehicle bodies. In particular, the invention concerns devices which provide for the welding of motor-vehicle bodies after they have been assembled provisionally by the loose connection of their component parts.

Known devices of the type indicated above generally comprise a station for welding the bodies, a conveyor line for transporting the loosely preassembled bodies to the station, locating means provided at the station for clamping the component parts of the body in the correct position for welding, and welding means provided at the station for welding the component parts of the body together after they have been clamped by the locating means.

During the last decade, the automotive industry has shown an ever greater tendency to use devices of the aforesaid type which have characteristics of flexibility, that is, which are adapted to operate on different body types. In fact, the use of flexible devices has drastically reduced the investment which was once necessary in order to bring a new model of car into production, as well as making the time needed to adapt the production plant to the new model of car practically negligible.

As regards the welding means used in the devices of the type indicated above, the desired characteristics of flexibility have been achieved by the use of robots with electrical spot-welding heads, the robots being programmable in dependence on the specific type of body to be assembled.

As far as the locating means for clamping the component parts of the bodies in the correct position for welding are concerned, however, the desired characteristics of flexibility have been achieved by the use of the invention which forms the subject of the same Applicant's German patent No 2,810,822 and the corresponding U.S. Pat. No. 4,162,387.

In the device described in the documents identified above, the welding station has at least two pairs of locating frames which can be interchanged rapidly in the working position, the frames of each pair carrying locating devices suitable for the configuration of a respective type of body to be welded. Flexible welding devices of this type have been produced and sold by the Applicant to many of the major motor-vehicle manufacturers in Europe and the United States. Nevertheless, it is felt that there is a continuing need for further improvement of these known devices.

From a different point of view, there is a need to make the welding means used in the devices as simple and cheap as possible. In fact, up to now, the use of flexible welding stations has generally been preferred to the use of several welding stations, each dedicated to a respective type of body to be welded, not only because the use of several stations takes up more space but also, and above all, because the cost of the welding robots makes it preferable to use a single set of robots which operate equally well on different body types, rather than respective sets of robots in several welding stations. Naturally, a simplification of the welding means could lead to the possible reconsideration of the use of "dedicated" welding stations and this would give greater choice to motor-vehicle manufacturers at the design stage, with the advantage that the best solution can be selected for the specific case under consideration at any time.

The object of the present invention is to provide a satisfactory solution to all the problems indicated above.

In order to achieve this object, the subject of the present invention is a device for welding motor-vehicle bodies which have been assembled loosely beforehand, comprising a station for welding the body, a conveyor line for transporting the loosely preassembled bodies to the station, locating means provided at the welding station for clamping the component parts of the body in the correct position for welding, and welding means provided at the station for welding the component parts of the body together after they have been clamped by the locating means, characterised in that the welding means comprise a plurality of laser-welding torches which are associated with the locating means and are connected to laser emission means by bundles of optical fibres.

In the present description and in the claims which follow, the term "laser-welding torch" is used to indicate an optical head for focussing the laser beam sent to the head onto one or more welding points.

In a preferred embodiment of the invention, the locating means comprise a plurality of locating devices supported by locating frames which also support the laser-welding torches, each locating frame also carrying at least one optical distributor device having an input for connection to a laser source and a plurality of outputs connected to the laser torches carried by the locating frame.

To advantage, the invention described above can be used in flexible welding stations which are intended to operate on at least two different types of motor-vehicle body and have at least two pairs of locating frames suitable for respective body types, the two pairs of frames being rapidly interchangeable in the working position in dependence on the type of body to be welded in the welding station.

In this case, a quick-coupling member is provided for the optical connection between the optical input of a particular locating frame and the respective laser source when the locating frame reaches the working position.

A different application of the invention described above provides for the use of a plurality of dedicated welding stations, that is, stations which are intended to operate on respective type of motor-vehicle body, each welding station having a pair of locating frames suitable for the respective body type and the laser emission means being connected to the welding torches of all the stations by bundles of optical fibres. In this application, the use of several dedicated stations does not involve an excessive increase in cost by virtue of the simplicity with which the welding means intended to operate in the various stations are produced.

Further characteristics and advantages of the invention will become clear from the description which follows, with reference to the appended drawings, provided purely by way of non-limiting example, in which:

FIG. 3 is a view of a detail of a device of FIG. 1 on an enlarged scale,

Figure 1:
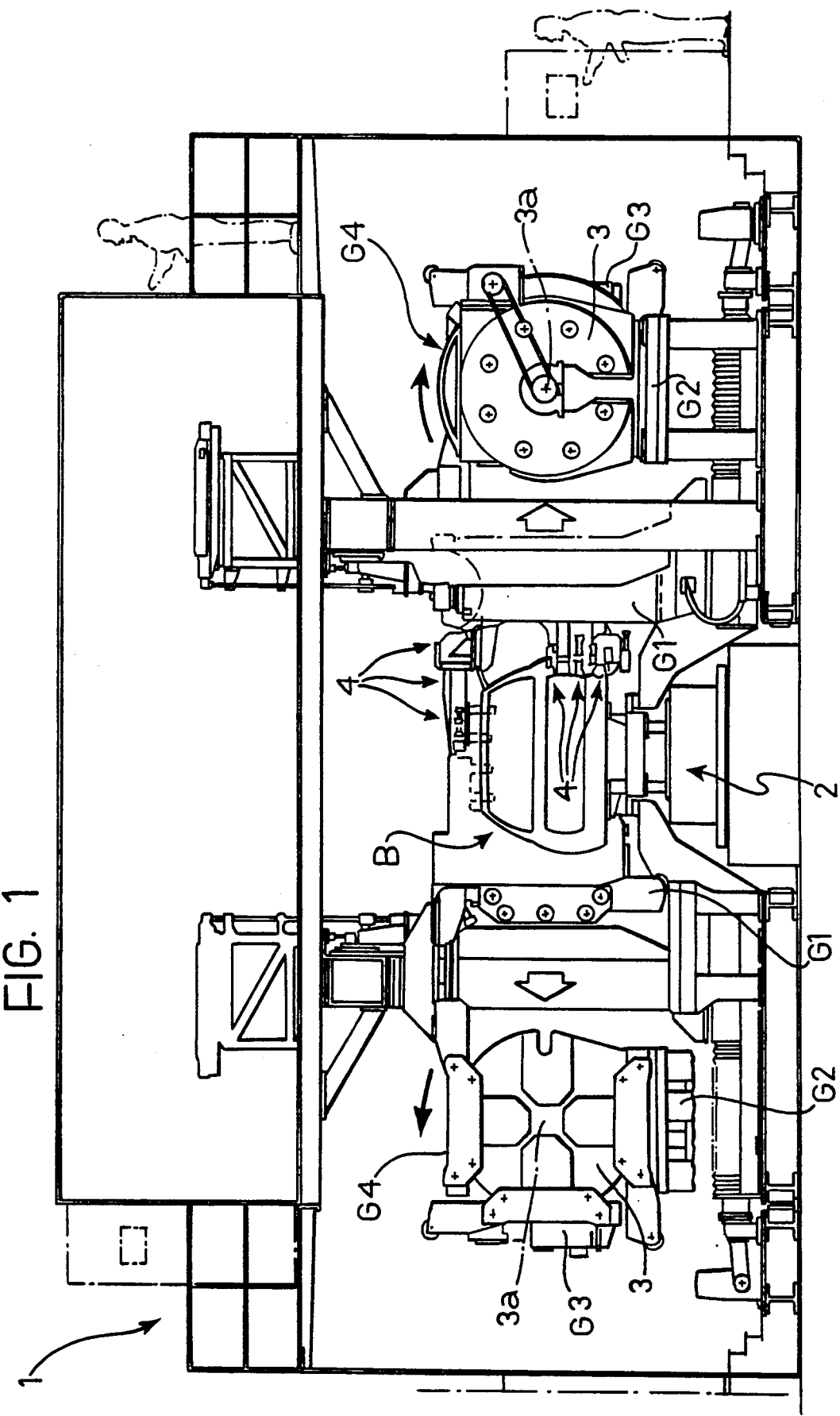
FIG. 1 is a schematic view of a welding device according to the invention.
Figure 2:
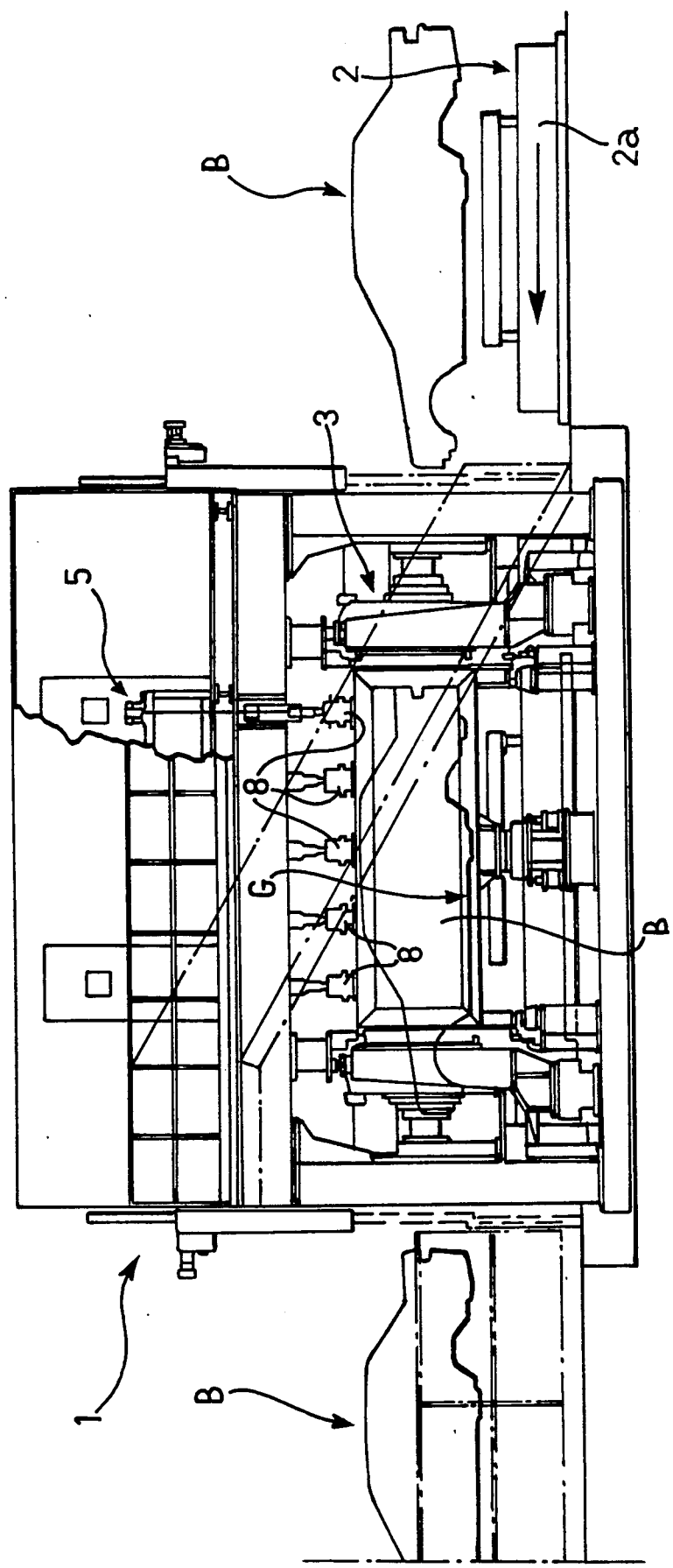
FIG. 2 is a side view of the device of FIG. 1.
Figure 5:
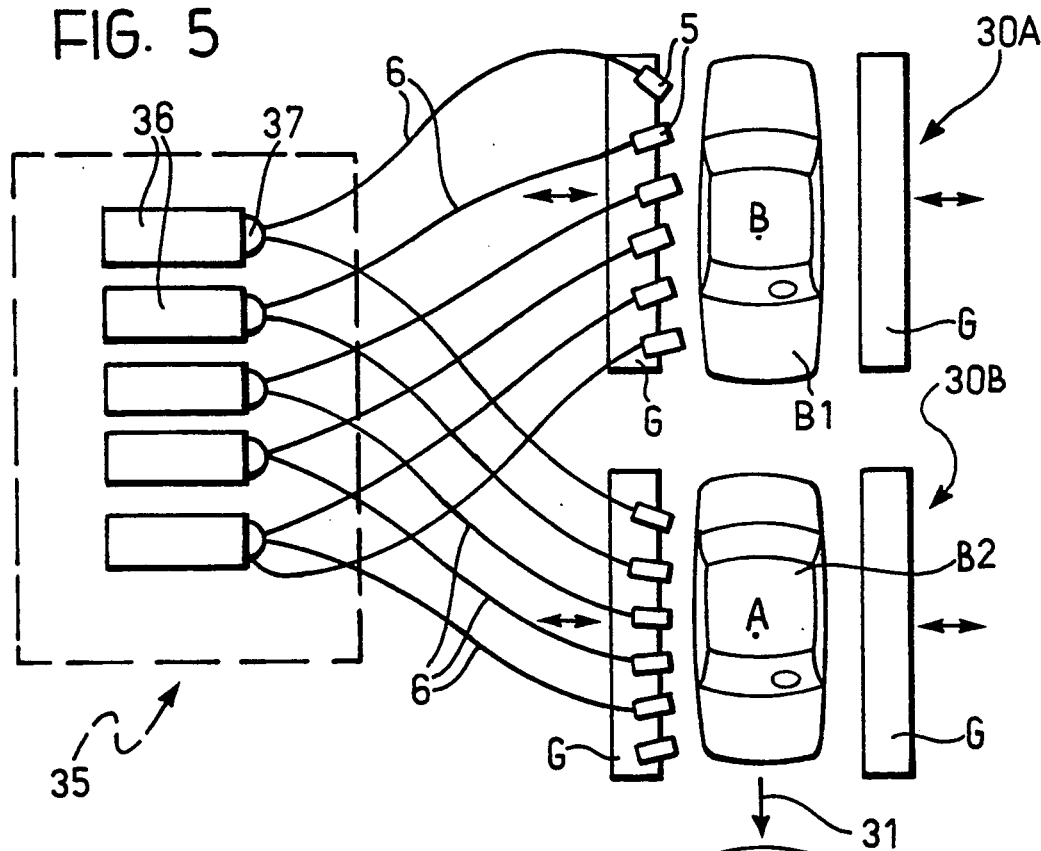
Figure 4:
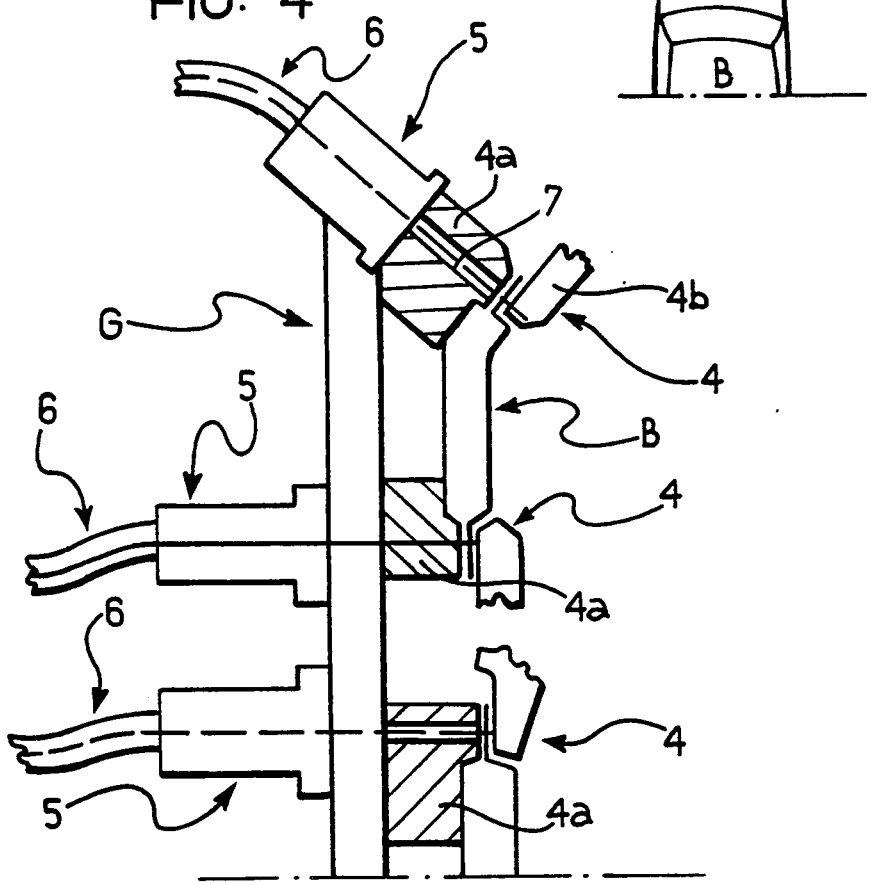

FIG. 4 is a sectional view of a further detail of the device according to the invention on an enlarged scale, and FIG. 5 shows a further embodiment of the invention. FIGS. 1-3 show, by way of example, the application of the invention to a flexible welding device of the type which forms the subject of European patent application No. EP-A-O 351 377 and the corresponding German utility model DE-U-8 812 396.

With reference to FIGS. 1-3, a welding station of the type described in the document identified above is generally indicated 1. The bodies B to be welded are supplied to the welding station in succession by means of a conveyor line 2. Neither the structural details of the conveyor line 2 nor those of all the other known components of the welding station 1 are described in detail below since—as already indicated—these details are supplied in the document identified above. Moreover, these structural details do not fall within the scope of the present invention. The bodies B are supplied to the welding station in a provisionally-assembled condition which is achieved by the loose connection of the component parts of the body. This loose connection can be achieved by means of bent tongues forming parts of the component parts of the body. Alternatively, the pallet 2a which moves along the line 2 and supports a respective body B may be provided with means for supporting the various component parts of the body in positions approximating to their final welding positions.

Still in a manner known from the German utility model DE-U-8 812 396, a drum 3 is provided on each side of the welding station and is mounted for rotation about an axis 3a parallel to the length of the conveyor line 2. Each drum 3 carries on its faces four locating frames G1, G2, G3 and G4, each of which supports a plurality of locating devices suitable for a specific type of motor-vehicle body and intended to clamp the component parts of a body of the respective type in the correct position for welding. The details of the structures of the locating frames and the way in which they are carried by the respective rotatable drum are not described in detail in the present description since they are also known from the prior document identified above. The same is true of the means for rotating the rotatable drums 3 about the axes 3a in order to present a respective pair of locating frames in positions facing the body in the welding station. As described in DE-U-8 812 396, each time a body B of a certain type reaches the welding station, the drums 3 must be in a position such that the two frames G corresponding to the specific body type face the two sides of the body. At this point, transverse translation devices take the two frames G from the drums and move them towards the two sides of the body so that the locating devices (indicated 4 in FIGS. 1-3) can engage the body B and clamp its component parts in the correct position for welding. Once the welding has been carried out (by welding means which will be described below) the clamping devices open and the two locating frames move outwardly to enable the welded body to be discharged from the station. If the next body to reach the welding station is of a different type from that welded previously, the two locating frames return to their respective rotatable drums and the latter are rotated until the new pair of locating frames are presented in positions facing the body to be welded, after which the cycle described above is repeated.

In the prior document cited above, the welding means provided to the station 1 are constituted by a plurality of programmable, electrical spot welding robots and/or by a plurality of welding guns arranged on the locating frames.

In the welding station according to the invention, however, the welding means are constituted by a plurality of laser-welding torches 5 which are associated with an equivalent number of locating devices 4 carried by each locating frame G (FIG. 4), and each of which receives a laser beam through a bundle of optical fibres 6. As illustrated in detail in FIG. 4, each locating device 4 includes two elements 4a, 4b which are movable between an open position (not shown) and a closed position in which they clamp together two or more pressed-sheet-metal parts forming parts of the body B to be welded. The element 4a is fixed to the locating frame G, as is the respective laser torch 5 which is adapted to focus the laser beam on the region to be welded, making it pass through a hole 7 in the element 4a.

In the preferred embodiment shown in FIGS. 1-3, each locating frame G has a set of optical distributor devices 8 each having an optical input for optical connection to a respective laser source S on the fixed structure of the welding station and a plurality of outputs 9 connected by means of bundles of optical fibres 6 to the laser torches 5 carried by the locating frame G. The optical distributor devices 8 are not shown in detail in the present description since they may be of any known type. For example, optical distributors of this type are made and sold by Lumonics JK Industrial Products, together with YAG (Yttrium, Aluminium, Garnet) laser emitters. In any case, the structures of the laser emittors and the respective optical distributors do not fall within the scope of the present invention.

According to the invention, the welding station has a plurality of quick-coupling devices 10 (FIGS. 2, 3) which enable the optical connection of the inputs of the distributor devices 8 carried by a particular locating frame G to the laser sources S when the locating frame reaches the working position corresponding to the engagement of the locating devices 4 with the body to be welded.

The quick-coupling device 10 comprises a slide 11 guided for vertical sliding on a guide 12 carried by the fixed structure 13 of the welding station 1 (FIG. 3). The slide 11 is moved vertically by a screw 14 which engages a nut 15 fixed to the slide 11. The screw 14 is rotated by an electric stepping motor 15 supported by the fixed structure 13. A bracket 16 is fixed to the slide 11 and supports a cylindrical body 17 which is guided for sliding on a vertical tubular shaft 18 whose upper end is connected to the output 19 of the laser source S.

The lower end of the cylindrical body 17 comprises a tubular connecting element 20 with a flared conical mouth 20a which is adapted to be coupled to a conical appendage 21 of the distributor device 8, coaxial with the input of the distributor device 8.

When the locating frame G is moving towards its working position in the welding station, the slide 11 is in the raised position. When the locating frame G has reached its working position, the conical appendage 21 is substantially aligned with the axis 18a of the tubular shaft 18. Once the frame G has stopped, the slide 11 is lowered so that the tubular element 20 fits onto the conical appendage 21. Any misalignment between the two coupling elements 20, 21 is corrected by virtue of the conical coupling since the distributor device 8 is supported by the locating frame G with the interposition of two perpendicular slides 22, 23. In other words, the device 8 is free to slide relative to the slide 23 along a line perpendicular to the plane of FIG. 3, the slide in turn being slidable relative to the frame G in the directions indicated by the arrows A in FIG. 3. The conical coupling forces the distributor 8 and the appendage 21 to assume the correct position. Once the coupling device is in the operative position, the laser beam emitted by the source S can reach the laser torches 5 carried by the frame G by passing through the tubular shaft 18, the cylindrical body 17, the optical distributor device 8 and the bundles of optical fibres 6. When the welding is completed, if the next body to be welded is of a different type, the slide 11 of each quick-coupling device 10 is raised to enable the locating frames G to be changed. Naturally, the use of the quick-coupling device 10 also enables the application of welding by means of laser torches 5 to flexible welding stations of types different from that illustrated purely by way of example, in FIGS. 1-3, for example, of the type described in the same Applicant's German patent No. 2 810 822 and in the corresponding U.S. Pat. No. 4 162 387.

As indicated in the introduction to the present description, the invention also enables and makes economically advantageous a solution which provides for a plurality of welding stations dedicated to the various types of body to be welded. FIG. 5 shows schematically, in plan, two welding stations 30A, 30B for operating on two different types of motor-vehicle body. Each welding station has a single pair of locating frames G provided with locating devices suitable for the configuration of the respective body type. A conveyor line 31 brings the bodies B1 and B2 of the two different types envisaged to the welding stations 30A, 30B in succession. Obviously, the bodies B1 stop only in the welding station 30A, whilst the bodies B2 stop only in the welding station 30B. Each locating frame G has a plurality of laser torches 5 associated with respective locating devices 4, in a manner similar to that illustrated in FIG. 4. The laser torches 5 of the two pairs of frames G of the two stations 30A, 30B are connected by bundles of optical fibres 6 to a single laser emission system 35 which, in the embodiment illustrated, comprises a plurality of laser sources 36 each provided at its output with an optical distributor device 37 whose outputs are in turn connected by bundles of optical fibres 6 both to laser torches 5 of the station 30A and to laser torches 5 of the station 30B.

Naturally, the principle of the invention remaining the same, the details of construction and forms of embodiment may be varied widely with respect to those described and illustrated purely by way of example, without thereby departing from the scope of the present invention.

What is claimed is:

1. A device for welding motor-vehicle bodies which have been assembled loosely beforehand, comprising:
    a station for welding the bodies,
    a conveyor line for transporting the loosely preassembled bodies to the welding station,
    locating means provided at the welding station for clamping the component parts of the body in the correct position for welding, said locating means being carried by two locating frames arranged at the two sides of the welding station, and
    welding means provided at the welding station for welding the component parts of the body together after they have been clamped by the locating means, wherein the welding means comprises a plurality of laser welding torches associated with the locating means, said laser-welding torches being carried by said locating frames, said device further comprising laser emission means and bundles of optical fibers connecting the laser emission means to the welding torches.

2. A device according to claim 1, wherein each locating frame carries an optical distributor device having an input for optical connection to a laser source and a plurality of outputs connected optically to the laser-welding torches carried by the locating frame.

3. A device according to claim 2, in which the welding station has at least two pairs of locating frames suitable for two respective body types, the two pairs of locating frames being rapidly interchangeable in the working position in dependence on the type of body to be welded in the welding station, wherein the welding station has quick-coupling means for the optical connection of the input of the optical distributor device carried by a particular locating frame to a respective laser source when the locating frame is brought to its working position.

4. A device according to claim 3, wherein the quick-coupling means comprise a cylindrical body aligned with the output of the laser source and defining a conical mouth at its end, and a conical appendage arranged in correspondence with the optical input of the optical distributor device, the cylindrical body being movable vertically between a raised disconnected position and a lowered position in which the conical mouth comes into engagement with the said appendage.

5. A device according to claim 4, wherein the optical distributor device is supported by the respective locating frame so that it can slide freely in two perpendicular directions.

6. A device according to claim 4, wherein it includes a vertically-movable slide which supports the cylindrical body, a motor carried by the fixed structure of the welding station, and a male-and-female thread system through which the motor effects the vertical movement of the slide.

7. A device according to claim 1, wherein several welding stations are provided for operating on respective types of motor-vehicle body, each welding station having a pair of locating frames with locating means suitable for a respective body type and the laser emission means being connected by optical fibres to the laser welding torches of all the welding stations.

8. A device according to claim 7, wherein the laser emission means comprise a plurality of emitters, an optical distributor device provided at the output of each emitter, and optical fibres connecting the outputs of the distributor devices to the laser-welding torches of all the welding stations.

* * * * *